(12) United States Patent
Padgett (10) Patent No.: US 7,444,340 B2
(45) Date of Patent: Oct. 28, 2008

(54) USING METADATA IN USER INTERFACES

(75) Inventor: Allan P. Padgett, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 305 days.

(21) Appl. No.: 10/839,976

(22) Filed: May 5, 2004

(65) Prior Publication Data

US 2005/0251518 A1 Nov. 10, 2005

(51) Int. Cl.
*G06F 7/00* (2006.01)
(52) U.S. Cl. .......................... 707/100; 707/101
(58) Field of Classification Search .................. 707/100
See application file for complete search history.

(56) References Cited

U.S. PATENT DOCUMENTS

| | | | |
|---|---|---|---|
| 5,664,189 A * | 9/1997 | Wilcox et al. ............... | 707/205 |
| 5,721,951 A * | 2/1998 | DorEl ........................... | 710/10 |
| 6,892,346 B1 * | 5/2005 | Lamb et al. ............... | 715/500.1 |
| 2001/0013126 A1 * | 8/2001 | Lemmons et al. ............. | 725/53 |
| 2001/0056434 A1 * | 12/2001 | Kaplan et al. ............. | 707/104.1 |
| 2003/0078905 A1 * | 4/2003 | Haugli et al. .................. | 707/1 |
| 2003/0229900 A1 * | 12/2003 | Reisman ....................... | 725/87 |
| 2005/0187943 A1 * | 8/2005 | Finke-Anlauff et al. ..... | 707/100 |
| 2005/0273791 A1 * | 12/2005 | Evans et al. .................. | 719/328 |

* cited by examiner

*Primary Examiner*—Charles Rones
*Assistant Examiner*—Fariborz Khoshnoodi
(74) *Attorney, Agent, or Firm*—Fish & Richardson P.C.

(57) ABSTRACT

Methods, systems and apparatus, including computer program products, for user interfaces. A user interface uses metadata of digital objects to navigate through a data structure that includes multiple containers to organize digital objects, such as digital images. Based on the metadata, the user interface can ignore empty containers that have no associated digital objects. The data structure can be presented without the empty containers, or the empty containers can be presented but automatically skipped when a user navigates through the data structure. For example in a calendar view, in which each day represents a container for images, days without images are automatically skipped when the user navigates in the calendar view.

59 Claims, 5 Drawing Sheets

USING METADATA IN USER INTERFACES

BACKGROUND

The present invention relates to user interfaces.

A user interface ("UI") provides a communication link between a user and a data processing application such as a software application. In the user interface, the software application presents information to the user and the user provides input to the software application. The user interface specifies a set of commands or menus to receive instructions from the user. A typical personal computer ("PC") application uses a graphical user interface ("GUI") that displays dialogs, menus or user selectable icons on a display device such as a cathode ray tube ("CRT") or a liquid crystal display ("LCD") monitor. The user enters the commands or selects menus or items from the menus using input devices such as keyboards or pointing devices, for example a mouse. A keyboard or a pointing device is a highly flexible tool that can be used to enter detailed information or select from a large number of options. The large number of options or other information can be simultaneously presented in the user interface by the PC application, because PCs typically use display devices having high-resolution screens that the users view from a relatively short distance.

Non-PC applications, however, have user interfaces that are often restricted to use smaller display resolution or less flexible input devices than those available for PC applications. In "living-room" applications, the user interface presents information on a display screen of a TV set or another display device that is viewed from a larger distance and is traditionally controlled by a remote control. Because of the larger viewing distance, menu items and icons should be larger for a living-room application than those for a PC application. Thus living-room applications can simultaneously present only a small number of options in their user interface. Furthermore, traditional TV remote controls have a limited number of control functions and much less flexibility than a keyboard or a mouse. For example, the mouse allows random navigation to any of the presented menu items, while a TV remote control is often limited to sequential navigation where a single button press can reach only a next or a previous menu item. User interfaces are also limited in hand-held devices such as mobile phones in which the display has a small resolution and no pointing device is available.

User interfaces are often used to organize, view or manage digital images or other digital objects. A digital object is a collection of digital data that includes content and metadata. Typically the digital object has been created to represent the information in the content, and the metadata corresponds to information about the content or its representation in the digital object. The content can represent images, sound tracks, animations or video, and the metadata describes how the content is formatted, what is the content about, or when or by whom the content was collected or stored. For example in a collection of digital photographs, each photograph has typically metadata that specifies when the photograph was taken. In addition, the metadata can include user defined tags to indicate the subject, the corresponding event or other context of the photograph.

SUMMARY

A user interface uses metadata of digital objects to navigate through a data structure that includes multiple containers to organize the digital objects, such as digital images. Based on the metadata, the user interface can ignore empty containers that have no associated digital objects. The data structure can be presented without the empty containers, or the empty containers can be presented but automatically skipped when a user navigates through the data structure. For example in a calendar view, in which each day represents a container for images, days without images are automatically skipped when the user navigates in the calendar view.

In general, in one aspect, the invention provides methods and apparatus, including computer program products, for user interfaces. A data structure organizing digital objects is received. The data structure specifies a plurality of containers. Each of the containers in the data structure is identified as empty or non-empty, where each non-empty container is associated with one or more respective digital objects. A reduced representation of the data structure is generated. The reduced representation includes a respective representation for each of the non-empty containers but no representation for the empty containers. The reduced representation of the data structure is presented in a user interface.

Particular implementations can include one or more of the following features. Containers that are not associated with any of the digital objects can be identified as empty. Containers that are associated with one or more digital objects of a particular type can be identified as non-empty, and containers that are not associated with digital objects of the particular type can be identified as empty. One or more of the identified empty containers can include digital objects having a type other than the particular type. The digital objects can include digital images. The reduced representation of the data structure can be presented in a user interface that has limited display capabilities. The reduced representation can be presented in a user interface of a living-room application or a hand-held device. Presenting the reduced representation of the data structure can include receiving user input requesting the reduced representation, and presenting the reduced representation in response to the received user input.

In general, in another aspect, the invention provides methods and apparatus, including computer program products for user interfaces. A data structure organizing digital objects is received. The data structure specifies a plurality of containers. Each of the containers in the data structure is identified as empty or non-empty, where each non-empty container is associated with one or more respective digital objects. A representation of the data structure is presented in a user interface. The representation of the data structure includes a respective representation for each of the non-empty and empty containers. In the user interface, user input is received, where the user input specifies instructions to focus subsequent user input to an empty container, and the received instructions are modified such that the subsequent user input is focused to a non-empty container.

Particular implementations can include one or more of the following features. Containers that are not associated with any of the digital objects can be identified as empty. Containers that are associated with one or more digital objects of a particular type can be identified as non-empty, and containers that are not associated with digital objects of the particular type can be identified as empty. One or more of the identified empty containers can include digital objects having a type other than the particular type. Receiving user input specifying instructions to focus subsequent user input to an empty container can include receiving instructions for positioning a cursor to mark an empty container in the presented representation, and modifying the received instructions can include positioning the cursor to mark the non-empty container. The representation of the data structure can define a calendar view in which each day represents a container for digital objects that are associated with that day. The digital objects can include digital images. User input can be received in a user interface without a pointing device. User input can be received in a user interface of a living-room application or a hand-held device.

In general, in another aspect, the invention provides methods and apparatus, including computer program products, for user interfaces. A data structure organizing digital objects is received. The data structure specifies a respective container to represent each day of a month. Each of the containers in the data structure is identified as empty or non-empty, wherein each non-empty container is associated with one or more respective digital objects and non-empty containers are not associated with any of the digital objects. A calendar view representation of the data structure is presented in a user interface, the calendar view representation including a respective representation for each container representing a day of the month. In the user interface, user input is received, where the user input specifies instructions to move a cursor to mark a day representing an empty container, and the received instructions are modified such that the cursor is moved to mark a day representing a non-empty container.

In general, in another aspect, the invention provides methods and apparatus, including computer program products, for user interfaces. Multiple pointers are received. Each pointer identifies a location for a respective digital content. Each of the pointers is identified as empty or non-empty, wherein each non-empty pointer identifies a location where the respective digital content can be found and each empty pointer identifies a location where the respective digital content cannot be found. A reduced representation of the pointers is presented in a user interface, where the reduced representation includes a respective user selectable representation for each of the non-empty pointers but no user-selectable representation for the empty pointers. In particular implementations, the reduced representation can include non-user-selectable representations for the empty pointers.

In general, in another aspect, the invention provides a system comprising a display to present elements of a user interface, and data processing apparatus configured to perform the following operations. The apparatus receives a data structure organizing digital objects, where the data structure specifies a plurality of containers. The apparatus identifies each of the containers in the data structure as empty or non-empty, where each non-empty container is associated with one or more respective digital objects. The apparatus generates a reduced representation of the data structure. The reduced representation includes a respective representation for each of the non-empty containers but no representation for the empty containers. The apparatus presents the reduced representation of the data structure in the display.

In particular implementations, the display can include a display of a hand-held device, a television monitor or a monitor of a personal computer.

In general, in another aspect, the invention provides a system comprising a display to present elements of a user interface, an input device to receive user input, and data processing apparatus configured to perform the following operations. The apparatus receives a data structure organizing digital objects, where the data structure specifies a plurality of containers. The apparatus identifies each of the containers in the data structure as empty or non-empty, where each non-empty container is associated with one or more respective digital objects. The apparatus presents a representation of the data structure in the display, where the representation of the data structure includes a respective representation for each of the non-empty and empty containers. The apparatus receives user input from the input device, where the received user input specifies instructions to focus subsequent user input to an empty container. The apparatus modifies the received instructions such that the subsequent user input is focused to a non-empty container.

In particular implementations, the display can include a display of a hand-held device or a television monitor, and the input device can include a hand-held remote control device.

The invention can be implemented to realize one or more of the following advantages. By ignoring empty containers of a data structure in a user interface, a user can more easily and efficiently navigate in the data structure. If the empty containers are not presented in the user interface, the user can easily find the digital objects he or she is looking for. Presenting the data structure without the empty folders can be particularly helpful for living-room, mobile phone or other applications whose user interface can present only a limited amount of data. If the empty containers are presented, they can be automatically skipped to help navigation in the data structure. Skipping the empty containers can be particularly helpful when the input device is a remote control or another input device whose next-item or previous-item buttons are used to go to a next or a previous item, respectively, in a sequential navigation scheme. Thus if two non-empty containers are separated by many empty ones, the user does not have to press the next-item button on the remote control many times to navigate through the empty containers. For example in a calendar view of an image collection, in which a day with images is followed by many days without images, the user can navigate to the next day that has images by a single press of the next-item button on the remote control.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
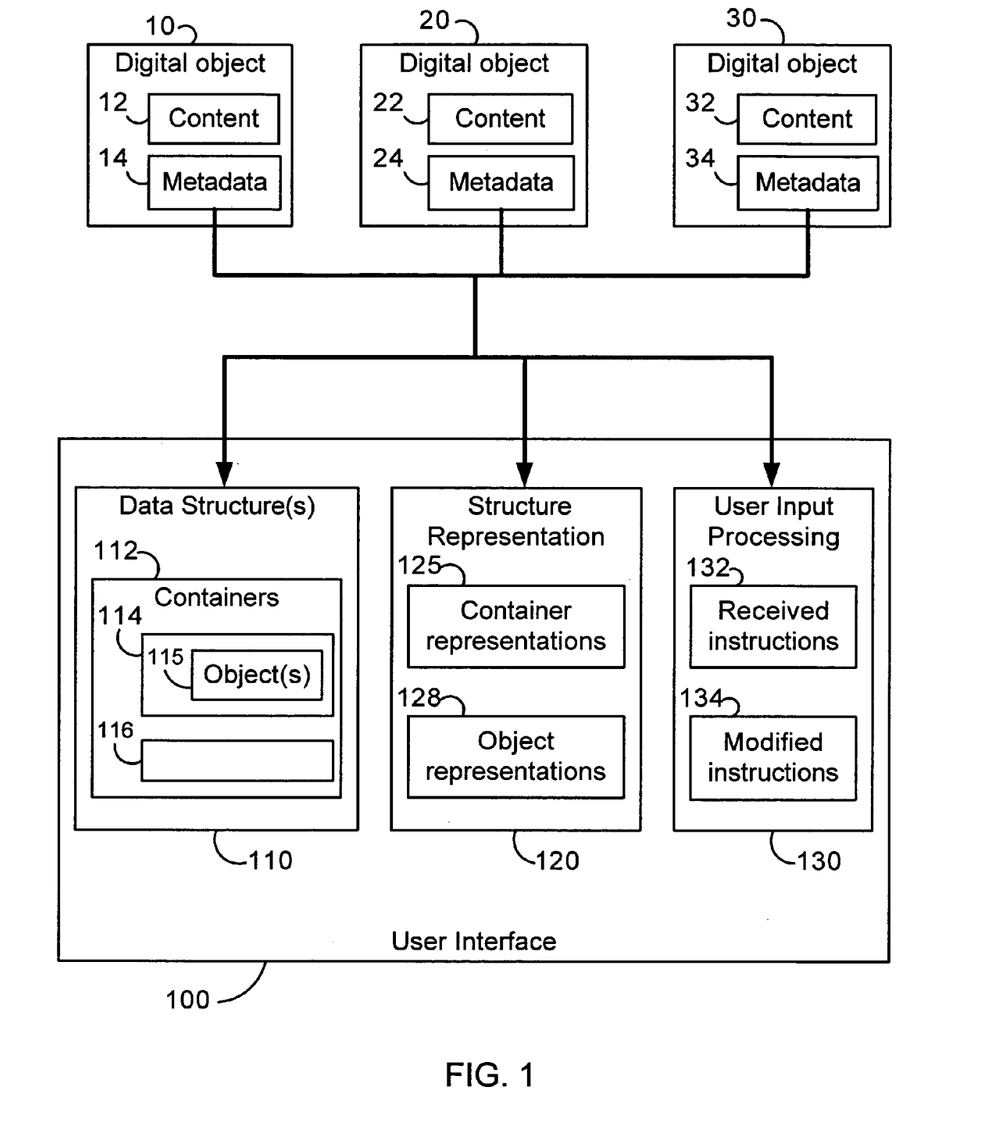
FIG. 1 is a schematic diagram illustrating a user interface using metadata.

FIG. 1 illustrates a user interface 100 for a software application that manages digital objects 10, 20 and 30. The three digital objects 10, 20 and 30 are only exemplary, and the digital interface 100 can process any other number of digital objects. In one implementation, the digital objects 10, 20 and 30 are digital images in an image data base and the user interface 100 is used by a living-room application, a hand-held device or another computing device that has limited displaying or user-input capabilities. Alternatively, the digital objects 10, 20 and 30 can include any other digital data, and the user interface 100 can be used by a software application for a PC or any other computing device using high-resolution display or a pointing input device.

The digital objects 10, 20 and 30 include respective contents 12, 22 and 32, and respective metadata 14, 24 and 34. The contents 12, 22 and 32 represent digital images, sound tracks, animations, video or other information, and the metadata 14, 24 and 34 specify information about the respective content. The metadata 14, 24 or 34 can specify when the respective content was created or when the respective object was stored in a particular database. The metadata 14, 24 and 34 can also specify a creator or a subject for the respective content. In addition, the metadata 14, 24 and 34 can include user defined tags that define a classification of the digital objects 10, 20, 30. For digital images, the tags can identify events, places, people or other information that are associated with the images.

The user interface 100 receives the metadata 14, 24 and 34, and uses the received metadata to specify one or more data structures 110, a structure representation 120 and user input processing 130. The data structures 110 are represented by the structure representation 120, which is presented to a user who can enter user input to navigate in the structure representation 120. The user input processing 130 can modify the received user input based on the metadata 14, 24 or 34.

The data structures 110 include containers 112, such as containers 114 and 116, and define relations between the containers 112. The containers 112 are virtual constructs to organize the digital objects 10, 20 and 30. The containers 112 can be predefined or they can be defined based on the information that is specified by the metadata 14, 24 and 34. If the metadata 14, 24 and 34 define a date of creation for each digital object, separate containers can be defined for years, months and years. If the metadata 14, 24 and 34 include tags that define classes, a separate container can be specified for each class defined by the tags.

Each container can include other containers and zero, one or more digital objects. A digital object is referred to as being associated with a container if the object is directly or indirectly included in the container. The object is indirectly included in a particular container if the object is associated with another container that is included in the particular container.

In one implementation, each container that is associated with one or more digital objects is identified as a non-empty container. For example, container 114 is not empty as it is associated with digital objects 115, which can include any of the digital objects 10, 20, and 30. A container that is not associated with any digital objects is identified as an empty container. Thus an empty container does not include digital objects either directly or indirectly. For example, the container 116 is empty. An empty container can include other containers that are also empty. However, a container is not empty if it includes a non-empty container.

In alternative representations, the containers 112 can be identified as empty or non-empty with respect to a particular type of digital objects, such as digital images, sound tracks or documents in a particular format. In these implementations, the non-empty containers include directly or indirectly one or more digital objects of the particular type, and empty containers do not include digital objects of the particular type. The empty containers, however, can include other types of digital objects.

The structure representation 120 specifies container representations 125 and object representations 128. The specified representations 125 and 128 can include graphics objects, animations, videos, sound tracks or other human perceivable representations. For example, container and object representations 125 and 128 can include icons that are defined by the software application or by the operating system on which the software application is running. The container and object representations 125 and 128 can be defined to be user-selectable objects in the user interface 100.

The container representations 125 correspond to one or more of the containers 112. The structure representation 120 is defined based exclusively on the data structure 110, or based on both the data structure 110 and the metadata 14, 24, and 34. In one implementation, the structure representation 120 specifies respective container representations only for non-empty containers. The non-empty containers are identified in the data structure 110 based on the metadata 14, 24 and 34. For example, the structure representation 120 can include container representations only for those years or months that are specified by at least one creation date in the metadata 14, 24 and 34 of the digital objects 10, 20 and 30. Alternatively, the structure representation 120 can include a respective representation for each of the containers 112, independent of whether the containers are empty or not.

When presented to a user, the structure representation 120 also specifies relations between the represented containers and the represented digital objects. For example, a particular container can be represented simultaneously with the objects and other containers that are included in the particular container. The particular container and the included objects and other containers can be arranged in different rows or columns such that the arrangement clearly indicates that the particular container includes the objects and the other containers. Alternatively, the relations between the containers and objects can be presented by graphics objects such as lines connecting the included objects to their respective containers. Or the relations between the containers and objects can be dynamically represented. For example, a container is first presented without the included objects and containers, and when the container is selected by user input, the user interface 100 presents the objects and other containers that are included in the selected container.

The user input processing 130 is defined to generate modified instructions 134 from instructions 132 received from a user. The received instructions 132 are modified based on the metadata 14, 24 and 34. In one implementation, both empty and non-empty containers are represented in the structure representation 120, and the containers have a predefined order. For example, each container represents a respective day of a month in a calendar view defined by the structure representation 120. When the user interface 100 receives an instruction to navigate a cursor from a current container to a next container according to the predefined order, the input processing 130 verifies whether the next container is empty or not according to the metadata 14, 24 and 34. If the next container is empty, the input processing 130 identifies the first non-empty container that follows the current container in the predefined order, and modifies the received instruction to navigate the cursor to that first non-empty container.

Figure 2A:
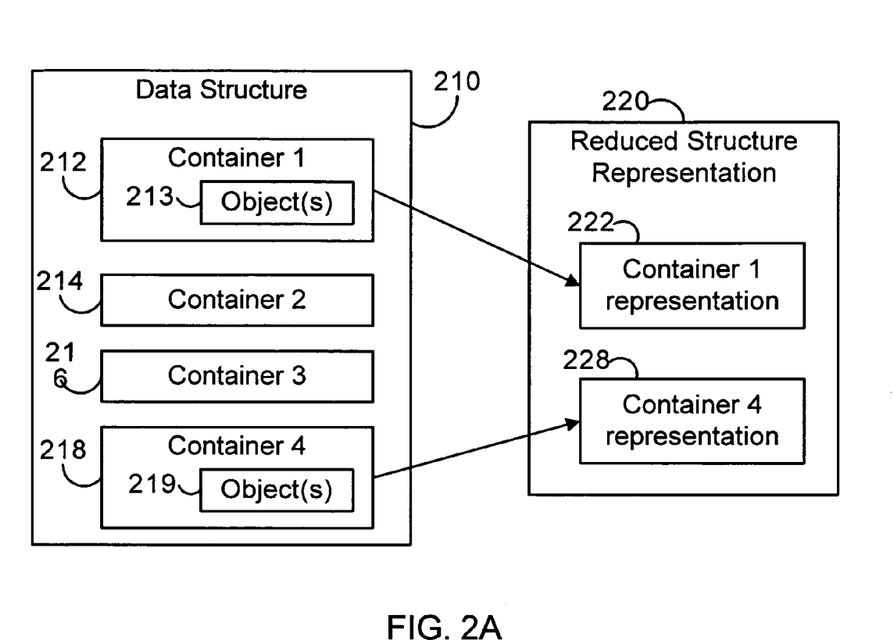
FIGS. 2A and 3A are schematic diagrams illustrating components of a user interface using metadata.

FIG. 2A illustrates a data structure 210 organizing digital objects, and a reduced structure representation 220 to represent the data structure 210. The data structure 210 and the reduced structure representation 220 are components specified in a system that includes the user interface 100 or another user interface using metadata of digital objects to define structure representations.

The data structure 210 is defined to organize the digital objects based on their metadata, and includes first, second, third and forth containers 212, 214, 216 and 218. The first and fourth containers 212 and 218 are not empty as they are associated with digital objects 213 and 219, respectively. The second and third containers 214 and 216 are empty. In alternative implementations, the data structure 210 can include any number of empty and non-empty containers.

The structure representation 220 is defined to represent the data structure 210 in a view presented to the user. The structure representation 220 includes container representations 222 and 228 that correspond to the non-empty first and fourth containers 212 and 218, respectively. Optionally, the structure representation 220 can also include representations for the objects 213 and 219. However, the structure representation 220 does not include representations for the empty containers 214 and 216. Thus when the structure representation 220 is presented, the user can navigate or search through the non-empty containers 212 and 218 without being distracted by the empty containers 214 and 216.

Figure 2B:
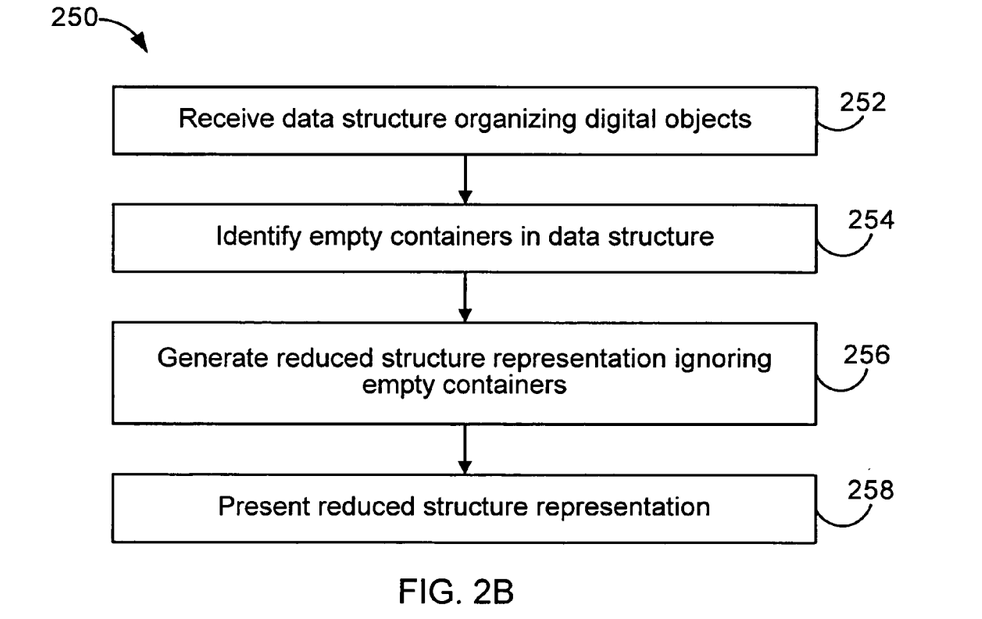
FIGS. 2B and 3B are schematic flow diagrams illustrating methods for the user interface components illustrated in FIGS. 2A and 3A, respectively.

FIG. 2B illustrates a method 250 that can be performed by a system including a user interface using metadata, such as the user interface specifying the components 210 and 220.

The system receives a data structure organizing digital objects (step 252). The digital objects include content and metadata. The content can specify images, sound tracks, animations or videos, and the metadata can specify creation dates or other information about the digital objects. The received data structure includes containers, such as containers representing years, months or days of creation dates.

The containers can be empty or non-empty in the received data structure. The non-empty containers are associated with one or more digital objects that are included directly or indirectly in the non-empty containers. The empty containers are not associated with any of the organized digital objects.

The system identifies empty containers in the data structure (step 254). The system uses the metadata of the digital objects to identify empty containers. The empty containers can be identified directly. For a particular container representing a particular year, month or day, the system can analyze the metadata to determine whether any of the digital objects was created in the particular year, month or day. If none of the objects meets those criteria, the particular container is empty. Alternatively, the empty containers can be identified indirectly by identifying all the non-empty containers. The metadata can be analyzed similarly for any other type of containers.

The system generates a reduced representation for the received data structure (step 256), and presents the reduced representation or a portion of it to the user (step 258). The reduced representation ignores the empty containers of the data structure. Thus only non-empty containers are represented when the data structure is presented to the user. Without the empty containers, the user can easily navigate in the reduced representation to find digital objects of interest. The reduced representation can be generated from a reduced data structure corresponding to the original data structure, or alternatively it can be generated on the fly as the user navigates the representation. The reduced representation can be generated or presented in response to user input. For example, the user interface can present a selectable icon to request the reduced representation. Or the reduced representation can be generated or presented automatically in a "browsing mode" of the user interface, where the user can navigate or search for digital objects without altering their position in the data structure. Thus the user is not allowed to add, move or copy digital objects in the browsing mode.

In alternative implementations, instead of a data structure, the system can receive pointers such as URL addresses, where each pointer identifies a location for a respective digital content. The system identifies the pointers as empty or non-empty. A pointer is non-empty if it identifies a location where the respective digital content can be found, and empty if it identifies a location where no respective digital content can be found. The system generates and presents a reduced representation of the pointers in a user interface. In the reduced representation only the non-empty pointers are selectable by the user. For example, the reduced representation includes a respective representation for each of the non-empty pointers but no representation for the empty pointers. Or the reduced representation can also include non-selectable representations for the empty pointers.

Figure 3A:
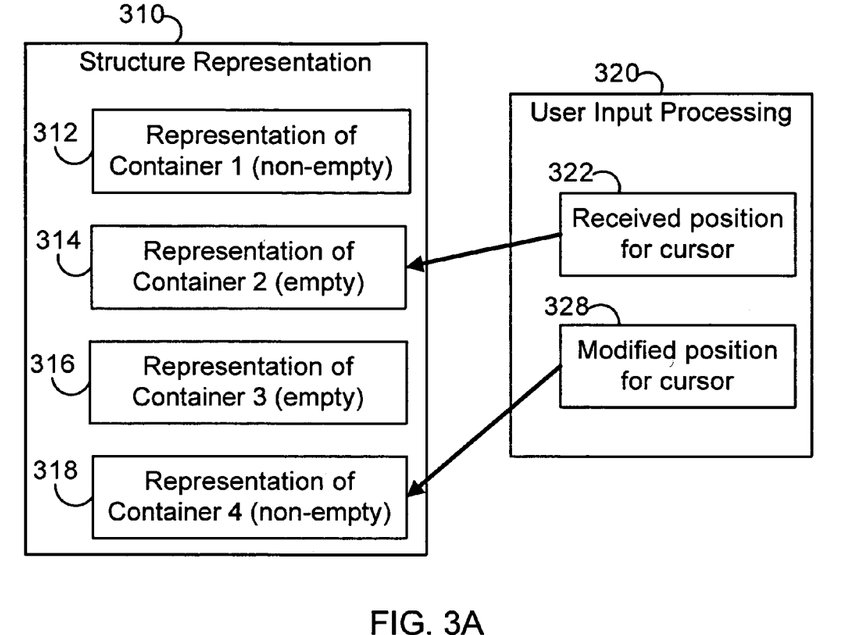

FIG. 3A illustrates a structure representation 310 corresponding to a data structure of digital objects, and a user input processing 320 to navigate in the data structure. The structure representation 310 and the user input processing 320 are components specified in a system that includes the user interface 100 or another user interface using metadata of digital objects to define user input processing.

The structure representation 310 is defined to represent the corresponding data structure in a view presented to the user. The structure representation 310 is defined to include a respective representation 312, 314, 316 and 318 for a first, a second, a third and a fourth container in the corresponding data structure. The structure representation 310 includes representations for both empty and non-empty containers. In the illustrated example, the first and fourth containers are not empty, and the second and third containers are empty. In alternative implementations, the structure representation 310 can represent any number of empty and non-empty containers. Optionally, the structure representation 310 can also include representations for the objects associated with the non-empty containers.

The user input processing 320 receives user input specifying a position 322 for a cursor of the user interface. The cursor is a movable object that is used to mark an object in the user interface. The cursor can be a graphics object that encloses, underlines or otherwise visually marks the corresponding user interface object. The marked object is typically the focus of other user input, such as user input selecting or requesting information about the marked object.

The received position 322 of the cursor marks the representation 314 of the second container, which is empty. If the received cursor position marks an empty container, the user input processing 320 modifies the received position to a modified position 328 that marks the non-empty fourth container. The non-empty container is identified based on metadata of the digital objects. In addition, the system can take into account a predetermined ordering of the represented containers and a direction of the cursor's move, as defined by the received position 322 and a previous position of the cursor. Thus if the first, second, third and fourth containers are ordered in that order, and the received position would move the cursor from a previous position that marks the first container, the user input processing 320 takes into account the direction of the move and identifies the next non-empty container, which is the fourth container according to the increasing order of the containers. Thus the user can navigate through multiple empty containers with a single user input, which is particularly useful if the user input device is operated by pressing next-item or previous item buttons.

Figure 3B:
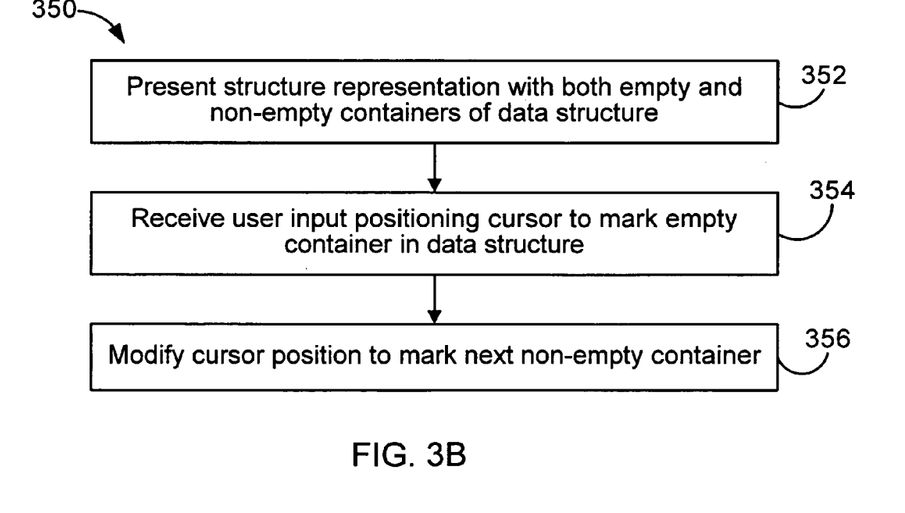

FIG. 3B illustrates a method 350 that can be performed by a system including a user interface using metadata for user input processing, such as the user interface specifying the components 310 and 320.

The system presents a structure representation with both empty and non-empty containers of a data structure organizing digital objects (step 352). For example, the structure representation includes container representations for years, months or days. The non-empty containers are associated with one or more digital objects that are included directly or indirectly in the non-empty containers, and the empty containers are not associated with any of the organized digital objects. For example, a digital image created on a particular date is associated with containers corresponding to the year, month and day of the particular date.

The system receives user input positioning a cursor to mark an empty container in data structure (step 354), and modifies the cursor position to mark a next non-empty container in the data structure (step 356). The next non-empty container is defined based on metadata about the digital objects and a direction defined by the received user input.

Figure 4:
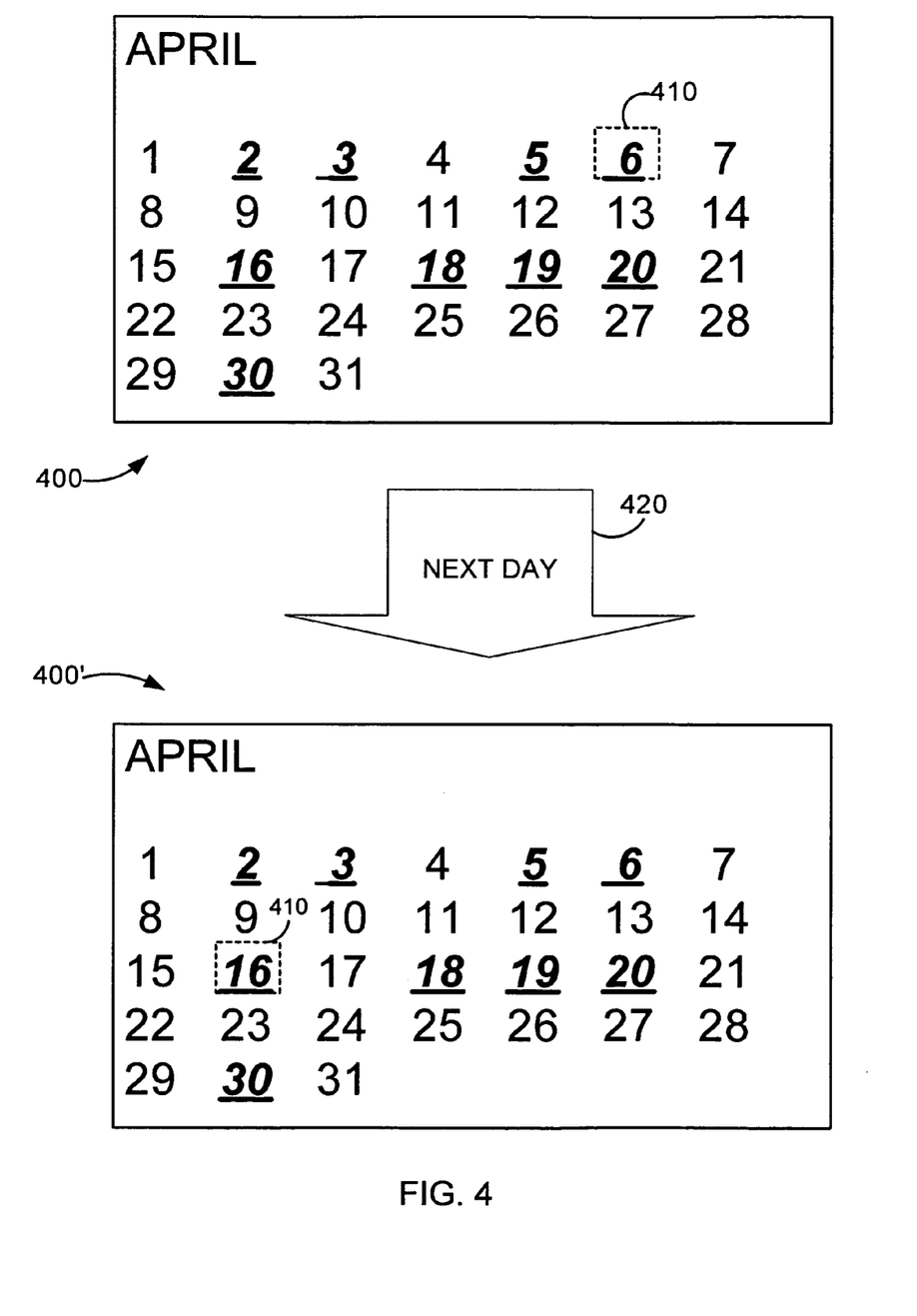
FIG. 4 illustrates an exemplary implementation of a calendar view in a user interface.
Figure 5:
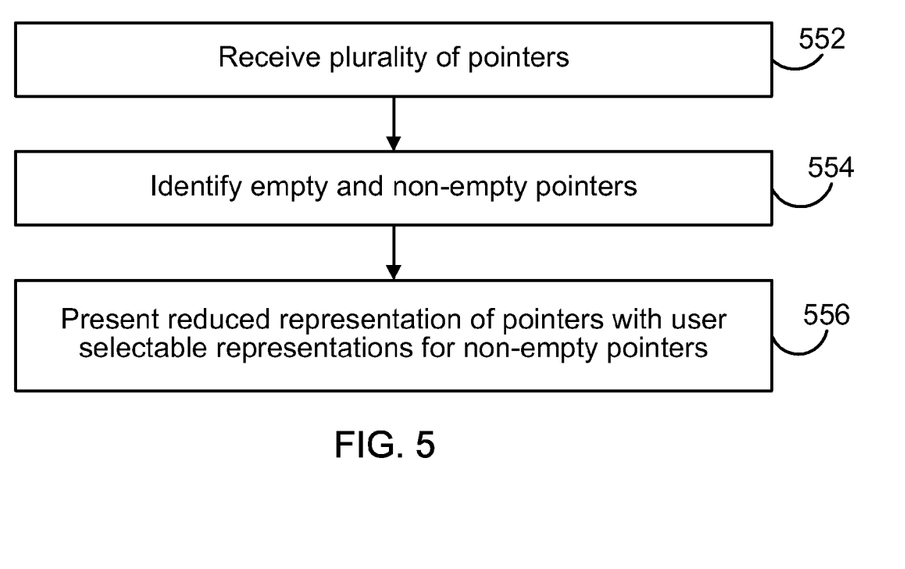
FIG. 5 is a schematic flow diagram illustrating an alternative user interface implementation.

FIG. 4 illustrates an exemplary implementation for modifying a cursor's position based on metadata. The exemplary implementation illustrates a calendar view 400 in which each day of a month ("APRIL") is represented by a corresponding number between one and thirty one. The calendar view 400 is a structure representation of a data structure in which each day of the month represents a container for digital objects such as digital images in an image database. A digital object is associated with a particular day of the month if the digital object was created (alternatively stored in the data base) on that day.

Similar to traditional calendars, the calendar view 400 represents each day of the month, independent of whether any digital object is associated with that day or not. Thus the calendar view 400 represents both empty containers (days without associated digital objects) and non-empty containers (days with associated digital objects). The calendar view 400 illustrates which days have associated digital objects by boldfacing and underlining the numbers representing the corresponding days (in the example, April 2, 3, 5, 6, 16, 18, 19, 20 and 30). Alternatively, the non-empty containers can be indicated by different techniques, for example in image databases, a thumbnail of a respective digital image can be visually associated with each day representing a non-empty container. In alternative implementations, the non-empty containers are not indicated.

The calendar view 400 includes a cursor 410 marking a particular day (April 6). The marked day is currently the focus of certain types of user input that is received by the user interface presenting the calendar view 400. Since the marked day represents a non-empty container, a user input can request a list of the digital objects associated with the marked day. Another user input can request a presentation of the digital objects associated with the marked day, where the presentation can include showing images or playing sound tracks.

A user input 420 defines an instruction to move the cursor 410 to the next day, which is April 7. The user input 420 can be specified by an input device, such as a remote control, that has a next-item button. The user input 420 would move the cursor 410 to a day that represents an empty container, which has no associated digital object.

As a subsequent calendar view 400' illustrates, the cursor 410 will not be moved to the next empty day, as originally specified by the user input 420. Instead, the instruction to move the cursor to the next day is modified based on metadata about the digital objects in the database. In particular, the cursor 410 is moved to a next non-empty day (April 16) that is the first day that has associated content following the requested day. Thus the user has reached the next day having associated digital objects with a single button push instead of ten button pushes that would be required if the empty containers are not skipped.

The techniques and systems described in this application can be implemented in one or more software applications, as a plug-in to a software application, or in hardware of electronic devices such as image capturing or displaying devices, such as digital cameras, CCD devices, scanners, or portable displaying devices such as personal digital assistants or mobile phones. For portable devices, one or more portions of the system can be implemented on a remote server.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network, including an embedded computer or processor controlling an electronic device, including a consumer electronic device, including by way of example, a television, a video recorder, a personal digital assistance, or a mobile telephone.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry. To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. The display device can include a television screen, a mobile phone, and the user can provide input using a cursor that is controlled by a remote control device.

The invention has been described in terms of particular embodiments. Other embodiments are within the scope of the following claims. For example, the steps of the invention can be performed in a different order and still achieve desirable results.

What is claimed is:

1. A software product, tangibly embodied in a machine-readable storage device, for user interfaces, the software product comprising instructions cause one or more data processing apparatus to perform operations comprising:
receiving digital objects, the digital objects consisting of images, sound tracks, animations or videos, wherein each digital object is a collection of digital data including both content and separate metadata describing the content; defining a data structure specifying a plurality of containers to organize the digital objects using information specified by the digital object metadata to define the containers, where the digital object metadata includes user-defined tags that define a classification for each digital object; identifying each of the containers in the data structure as empty or non-empty, wherein each non-empty container is associated with one or more respective digital objects and each empty container is associated with none of the digital objects; generating a reduced representation of the data structure, the reduced representation including a respective representation for each of the non-empty containers but no representation for any of the empty containers; and presenting the reduced representation of the data structure in a user interface, including presenting a simultaneous representation of the non-empty containers and no representation of the empty containers.

2. The software product of claim 1, wherein identifying each of the containers in the data structure as empty or non-empty includes:
identifying containers that are associated with one or more digital objects of a particular type as non-empty; and
identifying containers that are not associated with digital objects of the particular type as empty.

3. The software product of claim 2, wherein one or more of the identified empty containers includes digital objects having a type other than the particular type.

4. The software product of claim 1, wherein: presenting the reduced representation includes presenting the reduced representation of the data structure in a user interface that has limited display capabilities.

5. The software product of claim 4, wherein: presenting the reduced representation includes presenting the reduced representation in a user interface of a living-room application.

6. The software product of claim 4, wherein: presenting the reduced representation includes presenting the reduced representation in a user interface of a hand-held device.

7. The software product of claim 1, wherein presenting the reduced representation of the data structure includes: receiving user input requesting the reduced representation; and presenting the reduced representation in response to the received user input.

8. A software product, tangibly embodied in a machine-readable storage device, for user interfaces, the software product comprising instructions operable to cause one or more data processing apparatus to perform operations comprising: receiving a data structure organizing digital objects, the digital objects consisting of images, sound tracks, animations or videos, the data structure specifying a plurality of containers, wherein each digital object is a collection of digital data including both content and separate metadata describing the content, each container being capable of including other containers and two or more digital objects, each digital object being associated with one or more containers based on the digital object's metadata, where the digital object metadata includes user-defined tags that define a classification for each digital object; identifying each of the containers in the data structure as empty or non-empty, wherein each non-empty container is associated with one or more respective digital objects and each empty container is associated with none of the digital objects, the plurality of containers having an order, the plurality of containers including at least two non-empty containers and at least one empty container that is between the two non-empty containers in the order; presenting a reduced representation of the data structure in a user interface, the representation of the data structure including a respective simultaneous representation for each of the non-empty containers and no representation of the empty containers; in the user interface, receiving user input specifying an instruction to navigate a cursor from a current container to a next container; and
determining whether the next container is empty or non-empty, and when the next container is empty, identifying the first non-empty container after the next container according to the order, and modifying the specified instruction to navigate the cursor to the first non-empty container, and when the next container is non-empty, navigating the cursor to the next container.

9. The software product of claim 8, wherein identifying each of the containers in the data structure as empty or non-empty includes: identifying containers that are associated with one or more digital objects of a particular type as non-empty; and identifying containers that are not associated with digital objects of the particular type as empty.

10. The software product of claim 9, wherein one or more of the identified empty containers includes digital objects having a type other than the particular type.

11. The software product of claim 8, wherein the reduced representation of the data structure defines a calendar view in which each day represents a container for digital objects that are associated with that day.

12. The software product of claim 8, wherein: receiving user input includes receiving user input in a user interface without a pointing device.

13. The software product of claim 12, wherein: receiving user input includes receiving user input in a user interface of a living-room application or a hand-held device.

14. A software product, tangibly embodied in a machine-readable storage device, for user interfaces, the software product comprising instructions to cause one or more data processing apparatus to perform operations comprising: receiving a data structure organizing digital objects, the digital objects consisting of images, sound tracks, animations or videos, wherein each digital object is a collection of digital data including both content and separate metadata describing the content, the data structure specifying a respective container to represent each day of a month, wherein each container is capable of including other containers and two or more digital objects, each digital object being associated with one or more containers based on the digital object's metadata, where the digital object metadata includes user-defined tags that define a classification for each digital object; identifying each of the containers in the data structure as empty or non-empty, wherein each non-empty container is associated with one or more respective digital objects and empty containers are not associated with any of the digital objects, the plurality of containers having an order, the plurality of containers including at least two non-empty containers and at least one empty container that is between the two non-empty containers in the order; presenting the reduced calendar view representation of the data structure in a user interface, the reduced calendar view representation including a respective simultaneous representation for each non-empty container representing a day of the month and no representation for any empty container representing a day of the month; in the user interface, receiving user input specifying an instruction to navigate a cursor from a current container to a next container, the cursor marking a day representing the next container; and determining whether the next container is empty or non-empty, and when the next container is empty, identifying the first non-empty container after the next container according to the order, and modifying the specified instruction to navigate the cursor to mark a day representing the first non-empty container, and when the next container is non-empty, navigating the cursor to mark a day representing the next container.

15. A software product, tangibly embodied in a machine-readable storage device, for user interfaces, the software product comprising instructions to cause one or more data processing apparatus to perform operations comprising: receiving a plurality of pointers, each pointer identifying a location where respective digital content is to be found, the digital content consisting of images, sound tracks, animations or videos; identifying each of the pointers as empty or non-empty, wherein each non-empty pointer identifies a location where the respective digital content is to be found and each empty pointer identifies a location where no respective digital content is to be found, the plurality of pointers including at least one non-empty pointer and at least one empty pointer; and presenting the reduced representation of the pointers in a user interface, the reduced representation including a respective simultaneous user selectable representation for each of the non-empty pointers but no user-selectable representation for any of the empty pointers.

16. A computer implemented method for user interfaces, the method comprising: receiving digital objects, the digital objects consisting of images, sound tracks, animations or videos, wherein each digital object is a collection of digital data including both content and separate metadata describing the content; defining a data structure specifying a plurality of containers to organize the digital objects using information specified by the digital object metadata to define the containers, where the digital object metadata includes user-defined tags that define a classification for each digital object; identifying each of the containers in the data structure as empty or non-empty, wherein each non-empty container is associated with one or more respective digital objects and each empty container is associated with none of the digital objects; generating a reduced representation of the data structure, the reduced representation including a respective representation for each of the non-empty containers but no representation for any of the empty containers; and presenting the reduced representation of the data structure in a user interface, including presenting a simultaneous representation of the non-empty containers and no representation of the empty containers.

17. The method of claim 16, wherein identifying each of the containers in the data structure as empty or non-empty includes: identifying containers that are associated with one or more digital objects of a particular type as non-empty; and identifying containers that are not associated with digital objects of the particular type as empty.

18. A computer implemented method for user interfaces, the method comprising: receiving a data structure organizing digital objects, the digital objects consisting of images, sound tracks, animations or videos, wherein each digital object is a collection of digital data including both content and separate metadata describing the content; specifying a plurality of containers within the data structure, wherein the plurality of containers is defined based on information specified by the digital object metadata, each container being capable of including other containers and two or more digital objects, each digital object being associated with one or more containers based on the digital object's metadata, where the digital object metadata includes user-defined tags that define a classification for each digital object; identifying each of the containers in the data structure as empty or non-empty, wherein each non-empty container is associated with one or more respective digital objects and each empty container is associated with none of the digital objects, the plurality of containers having an order, the plurality of containers including at least two non-empty containers and at least one empty container that is between the two non-empty containers in the order; presenting the reduced representation of the data structure in a user interface, the representation of the data structure including a respective simultaneous representation for each of the non-empty containers and no representation for any of the empty containers; in the user interface, receiving user input specifying an instruction to navigate a cursor from a current container to a next container; and determining whether the next container is empty or non-empty, and when the next container is empty, identifying the first non-empty container after the next container according to the order, and modifying the specified instruction to navigate the cursor to the first non-empty container, and when the next container is non-empty, navigating the cursor to the next container.

19. The method of claim 18, wherein identifying each of the containers in the data structure as empty or non-empty includes: identifying containers that are associated with one or more digital objects of a particular type as non-empty; and identifying containers that are not associated with digital objects of the particular type as empty.

20. A computer implemented system, comprising: a display to present elements of a user interface; and data processing apparatus configured to perform operations comprising: receiving digital objects, the digital objects consisting of images, sound tracks, animations or videos, wherein each digital object is a collection of digital data including both content and separate metadata describing the content; defining a data structure specifying a plurality of containers to organize the digital objects using information specified by the digital object metadata to define the containers, where the digital object metadata includes user-defined tags that define a classification for each digital object; identifying each of the containers in the data structure as empty or non-empty, wherein each non-empty container is associated with one or more respective digital objects and each empty container is associated with none of the digital objects;

generating a reduced representation of the data structure, the reduced representation including a respective representation for each of the non-empty containers but no representation for any of the empty containers; and presenting the reduced representation of the data structure in the display, including presenting a simultaneous representation of the two non-empty containers and no representation of the empty containers.

21. The system of claim 20, wherein the display includes a display of a hand-held device.

22. The system of claim 20, wherein the display includes a television monitor.

23. The system of claim 20, wherein the display includes a monitor of a personal computer.

24. A computer implemented system, comprising: a display to present elements of a user interface; an input device to receive user input; and data processing apparatus configured to perform operations comprising: receiving a data structure organizing digital objects, the digital objects consisting of images, sound tracks, animations or videos, the data structure specifying a plurality of containers, wherein each digital object is a collection of digital data including both content and separate metadata describing the content, each container being capable of including other containers and two or more digital objects, each digital object being associated with one or more containers based on the digital object's metadata, where the digital object metadata includes user-defined tags that define a classification for each digital object;
identifying each of the containers in the data structure as empty or non-empty, wherein each non-empty container is associated with one or more respective digital objects and each empty container is associated with none of the digital objects, the plurality of containers having an order, the plurality of containers including at least two non-empty containers and at least one empty container that is between the two non-empty containers in the order; presenting the reduced representation of the data structure in the display, the representation of the data structure including a respective simultaneous representation for each of the non-empty containers and no representation for any of the empty containers; receiving user input from the input device, the received user input specifying an instruction to navigate a cursor from a current container to a next container; and determining whether the next container is empty or non-empty, and when the next container is empty, identifying the first non-empty container after the next container according to the order, and modifying the specified instruction to navigate the cursor to the first non-empty container, and when the next container is non-empty, navigating the cursor to the next container.

25. The system of claim 24, wherein the display includes a display of a hand-held device or a television monitor.

26. The system of claim 24, wherein the input device includes a hand-held remote control device.

27. The software product of claim 8, wherein the non-empty containers are identified based on the metadata of the digital objects.

28. The software product of claim 8, wherein an ordering of the represented containers and a direction of the cursor movement are defined by a received position of the cursor and a previous position of the cursor.

29. The software product of claim 1, wherein when a first non-empty container is selected by user input, the user interface presents the objects that are included in the first non-empty container.

30. The software product of claim 1, wherein the reduced representation is generated automatically in a browsing mode of the user interface.

31. The system of claim 24, wherein the non-empty containers are identified based on the metadata of the digital objects.

32. The system of claim 24, wherein an ordering of the represented containers and a direction of the cursor movement are defined by a received position of the cursor and a previous position of the cursor.

33. The system of claim 20, wherein when a first non-empty container is selected by user input, the user interface presents the objects that are included in the first non-empty container.

34. The system of claim 20, wherein the reduced representation is generated automatically in a browsing mode of the user interface.

35. The system of claim 20, wherein identifying each of the containers in the data structure as empty or non-empty includes: identifying containers that are associated with one or more digital objects of a particular type as non-empty; and identifying containers that are not associated with digital objects of the particular type as empty.

36. The system of claim 35, wherein one or more of the identified empty containers includes digital objects having a type other than the particular type.

37. The system of claim 20, wherein: presenting the reduced representation includes presenting the reduced representation of the data structure in a user interface that has limited display capabilities.

38. The system of claim 37, wherein: presenting the reduced representation includes presenting the reduced representation in a user interface of a living-room application.

39. The system of claim 37, wherein: presenting the reduced representation includes presenting the reduced representation in a user interface of a hand-held device.

40. The system of claim 20, wherein presenting the reduced representation of the data structure includes: receiving user input requesting the reduced representation; and presenting the reduced representation in response to the received user input.

41. The system of claim 24, wherein identifying each of the containers in the data structure as empty or non-empty includes: identifying containers that are associated with one or more digital objects of a particular type as non-empty; and identifying containers that are not associated with digital objects of the particular type as empty.

42. The system of claim 41, wherein one or more of the identified empty containers includes digital objects having a type other than the particular type.

43. The system of claim 24, wherein the reduced representation of the data structure defines a calendar view in which each day represents a container for digital objects that are associated with that day.

44. The system of claim 24, wherein: receiving user input includes receiving user input in a user interface without a pointing device.

45. The system of claim 44, wherein: receiving user input includes receiving user input in a user interface of a living-room application or a hand-held device.

46. A computer implemented system, comprising: a display to present elements of a user interface; an input device to receive user input; and data processing apparatus configured to perform operations comprising: receiving a data structure organizing digital objects, the digital objects consisting of images, sound tracks, animations or videos, wherein each digital object is a collection of digital data including both content and separate metadata describing the content, the data structure specifying a respective container to represent each day of a month, wherein each container is capable of including other containers and two or more digital objects, each digital object being associated with one or more containers based on the digital object's metadata, where the digital object metadata includes user-defined tags that define a classification for each digital object; identifying each of the containers in the data structure as empty or non-empty, wherein each non-empty container is associated with one or more respective digital objects and empty containers are not associated with any of the digital objects, the plurality of containers having an order, the plurality of containers including at least two non-empty containers and at least one empty container that is between the two non-empty containers in the order; presenting the reduced calendar view representation of the data structure in the display, the reduced calendar view representation including a respective simultaneous representation for each non-empty container representing a day of the month and no representation for any empty container representing a day of the month; receiving user input from the input device, the received user input specifying an instruction to navigate a cursor from a current container to a next container, the cursor marking a day representing the next container; and determining whether the next container is empty or non-empty, and when the next container is empty, identifying the first non-empty container after the next container according to the order, and modifying the specified instruction to navigate the cursor to mark a day representing the first non-empty container, and when the next container is non-empty, navigating the cursor to mark a day representing the next container.

47. A computer implemented system, comprising: a display to present elements of a user interface; and data processing apparatus configured to perform operations comprising: receiving a plurality of pointers, each pointer identifying a location where respective digital content is to be found, the digital content consisting of images, sound tracks, animations or videos; identifying each of the pointers as empty or non-empty, wherein each non-empty pointer identifies a location where the respective digital content is to be found and each empty pointer identifies a location where no respective digital content is to be found, the plurality of pointers including at least one non-empty pointer and at least one empty pointer; and presenting the reduced representation of the pointers in the display, the reduced representation including a respective simultaneous user selectable representation for each of the non-empty pointers but no user-selectable representation for any of the empty pointers.

48. The software product of claim 1, further comprising instructions to cause one or more data processing apparatus to perform operations comprising: receiving digital object metadata from a user interface, and associating that metadata with a corresponding digital object.

49. The product of claim 8, further comprising instructions cause one or more data processing apparatus to perform operations comprising: receiving digital object metadata from a user interface, and associating that metadata with a corresponding digital object.

50. The product of claim 14, further comprising instructions to cause one or more data processing apparatus to perform operations comprising: receiving digital object metadata from a user interface, and associating that metadata with a corresponding digital object.

51. The method of claim 16, further comprising: receiving digital object metadata from a user interface, and associating that metadata with a corresponding digital object.

52. The method of claim 18, further comprising: receiving digital object metadata from a user interface, and associating that metadata with a corresponding digital object.

53. The system of claim 20, where the data processing apparatus is further configured to perform operations comprising: receiving digital object metadata from a user interface, and associating that metadata with a corresponding digital object.

54. The system of claim 24, where the data processing apparatus is further configured to perform operations comprising: receiving digital object metadata from a user interface, and associating that metadata with a corresponding digital object.

55. The system of claim 46, where the data processing apparatus is further configured to perform operations comprising: receiving digital object metadata from a user interface, and associating that metadata with a corresponding digital object.

56. The software product of claim 1, where the plurality of containers includes at least two non-empty containers and at least one empty container that is between the two non-empty containers in the order.

57. The method of claim 16, where the plurality of containers includes at least two non-empty containers and at least one empty container that is between the two non-empty containers in the order.

58. The system of claim 20, where the plurality of containers includes at least two non-empty containers and at least one empty container that is between the two non-empty containers in the order.

59. A software product, tangibly embodied in a machine-readable storage device, for user interfaces, the software product comprising instructions to cause one or more data processing apparatus to perform operations comprising: receiving a data structure organizing digital objects, the digital objects consisting of images, sound tracks, animations or videos, the data structure specifying a plurality of containers, wherein each digital object is a collection of digital data including both content and separate metadata describing the content, each container being capable of including other containers and two or more digital objects, each digital object being associated with one or more containers based on the digital object's metadata, where the digital object metadata includes user-defined tags that define a classification for each digital object; identifying each of the containers in the data structure as empty or non-empty, wherein each non-empty container is associated with one or more respective digital objects and each empty container is associated with none of the digital objects, the plurality of containers having an order, the plurality of containers including at least two non-empty containers and at least one empty container that is between the two non-empty containers in the order; generating a reduced representation of the data structure, the reduced representation including a respective representation for each of the non-empty containers but no representation for any of the empty containers; and presenting the reduced representation of the data structure in a user interface, including presenting a simultaneous representation of the two non-empty containers and no representation of the empty container that is between the two non-empty containers, wherein the representation of the non-empty containers includes no representation of the respective objects associated with the non-empty containers.

* * * * *

UNITED STATES PATENT AND TRADEMARK OFFICE
CERTIFICATE OF CORRECTION

| | | |
|---|---|---|
| PATENT NO. | : 7,444,340 B2 | Page 1 of 1 |
| APPLICATION NO. | : 10/839976 | |
| DATED | : October 28, 2008 | |
| INVENTOR(S) | : Allan P. Padgett | |

It is certified that error appears in the above-identified patent and that said Letters Patent is hereby corrected as shown below:

Claim 1, Line 3: Delete "instructions cause" and insert -- instructions to cause --.

Claim 49, Line 1: After "instructions" insert -- to --.

Signed and Sealed this

Seventeenth Day of March, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,444,340 B2 | Page 1 of 1 |
| APPLICATION NO. | : 10/839976 | |
| DATED | : October 28, 2008 | |
| INVENTOR(S) | : Allan P. Padgett | |

It is certified that error appears in the above-identified patent and that said Letters Patent is hereby corrected as shown below:

Column 11, Claim 1, Line 21: Delete "instructions cause" and insert -- instructions to cause --.

Column 17, Claim 49, Line 52: After "instructions" insert -- to --.

This certificate supersedes the Certificate of Correction issued March 17, 2009.

Signed and Sealed this

Seventh Day of April, 2009

JOHN DOLL
*Acting Director of the United States Patent and Trademark Office*